United States Patent [19]

Lenzen et al.

[11] Patent Number: 4,736,987
[45] Date of Patent: Apr. 12, 1988

[54] ROCK CUTTING ASSEMBLY

[75] Inventors: Dieter Lenzen, Lethmate; Philip Bechem, Hagen, both of Fed. Rep. of Germany

[73] Assignee: General Mining Union Corporation Limited, Johannesburg, South Africa

[21] Appl. No.: 871,894

[22] Filed: Jun. 9, 1986

[51] Int. Cl.$^4$ .................. E21B 10/08; E21B 10/10
[52] U.S. Cl. ............................ 299/86; 125/5; 175/343; 175/350; 409/200; 409/236
[58] Field of Search ................. 299/79, 81, 14, 86, 299/89; 175/398, 343, 354, 371, 350; 125/5; 83/646, 647.5; 409/200, 231, 234, 236; 172/46, 120, 123, 125, 118

[56] References Cited
U.S. PATENT DOCUMENTS 3,374,034  3/1968  Conner ............................ 299/86
3,412,816  11/1968 Lautsch ......................... 299/86 X
3,860,292  1/1975  Bechem .......................... 299/14 X Primary Examiner—Stephen J. Novosad
Assistant Examiner—David J. Bagnell
Attorney, Agent, or Firm—Jones, Tullar & Cooper

[57] ABSTRACT

A rock cutting assembly which includes a rock cutting roller with the roller being composed of a central hub portion and an annular cutting element which is rotatably mounted on the hub and carries rock cutting formations, means for driving the hub portion of the roller about an axis which is eccentrically displaced from the hub axis, means engaged with the annular cutting element to limit its direction of rotation relatively to that of its hub to one direction only and means for balancing the roller against its eccentricity as the hub is rotated about its drive axis. Preferably the assembly includes a plurality of rock cutting rollers which are rotatable about a common drive axis with the axes of each roller hub being eccentrically displaced by a common distance and in such a direction from the drive axis so that the rollers balance each other as the rollers are rotated about their drive axis.

10 Claims, 2 Drawing Sheets

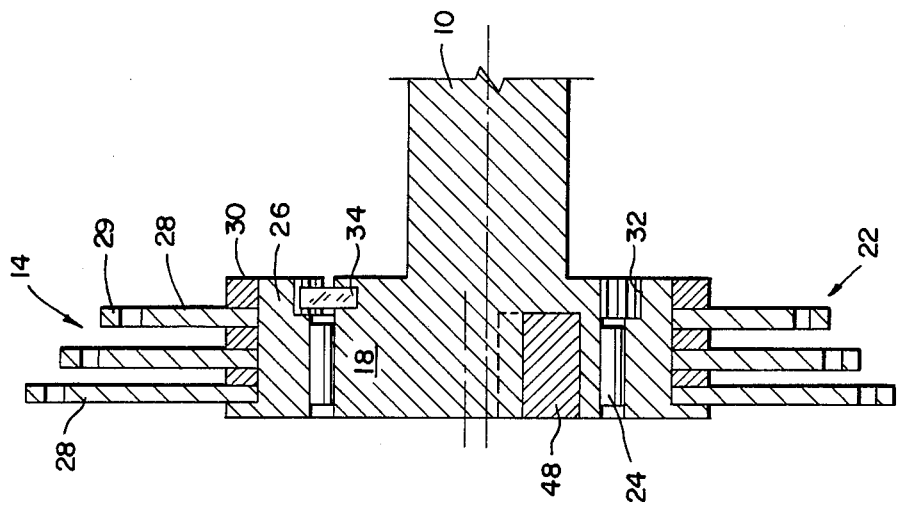
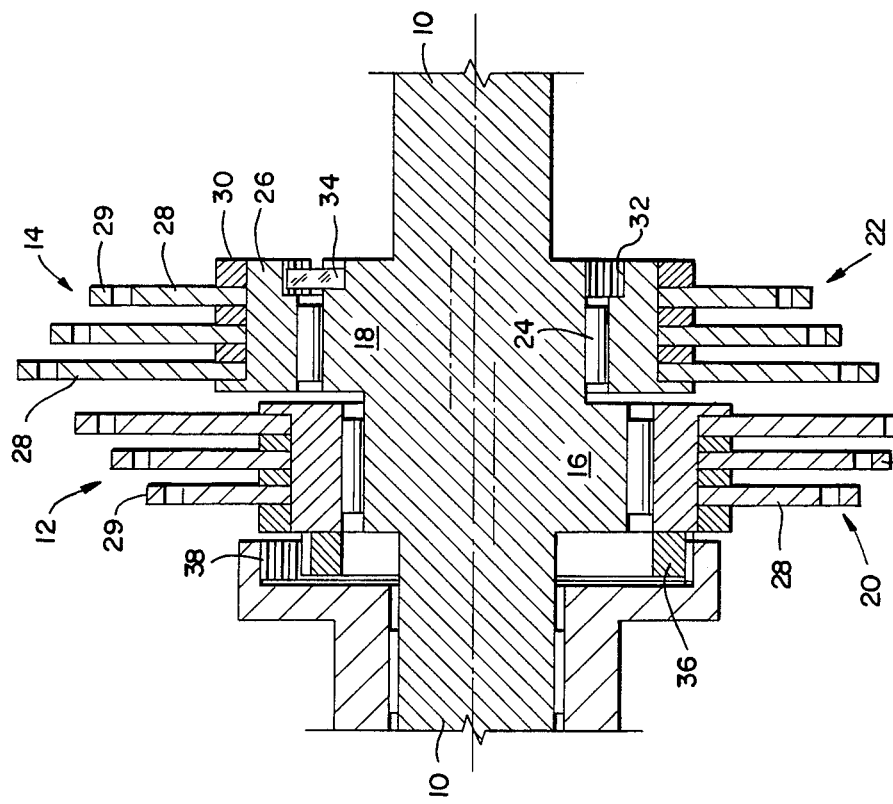

ROCK CUTTING ASSEMBLY

FIELD OF THE INVENTION

This invention relates to an activated or radially vibratable rock cutting assembly or tool for use with a machine which is capable of rotating it for the purpose of rock cutting.

In this specification the term rock cutting is to be taken to include any rock breaking or comminution process which will result in the cutting of rock.

SUMMARY OF THE INVENTION

A rock cutting assembly according to the invention includes a rock cutting roller with the roller being composed of a central hub portion and an annular cutting element which is rotatably mounted on the hub and carries rock cutting formations, means for driving the hub portion of the roller about an axis which is eccentrically displaced from the hub axis, means engaged with the annular cutting element to limit its direction of rotation relatively to that of its hub to one direction only and means for balancing the roller against its eccentricity as the hub is rotated about its drive axis.

In a preferred form of the invention the assembly includes a plurality of the rock cutting rollers which are rotatable about a common drive axis with the axis of each roller hub being eccentrically displaced by a common distance and in such a direction from the drive axis that the rollers balance each other as the rollers are rotated about their drive axis.

Preferably, but not essentially, the hub for each roller is integral with that of an adjacent roller. Conveniently the hub portions of the outer rollers of the assembly each carry a support shaft which lies on the drive axis of the assembly.

Further according to the invention the cutting element rotation limiting means are ratchet arrangements. The ratchet arrangements may each consist of a toothed ring on the cutting element and a movable catch on its hub which is engaged with the teeth on the ring.

Still further according to the invention the cutting element rotation limiting means on the or each roller includes a first ring gear which is attached to the cutting element and a second gear which is meshed with the first and is non-rotatably attached to fixed structure adjacent the roller. The second gear may be a ring gear which is held concentric with the axis of the support shaft.

BRIEF DESCRIPTION OF THE DRAWINGS

The invention is now described by way of example only with reference to the drawings in which:

FIG. 1 is a cross-sectioned end elevation of one embodiment of the rock cutting assembly of the invention;

FIG. 2 is a cross-sectioned end elevation of a single roller assembly; and

DETAILED DESCRIPTION OF THE ILLUSTRATED EMBODIMENTS

Figure 4:
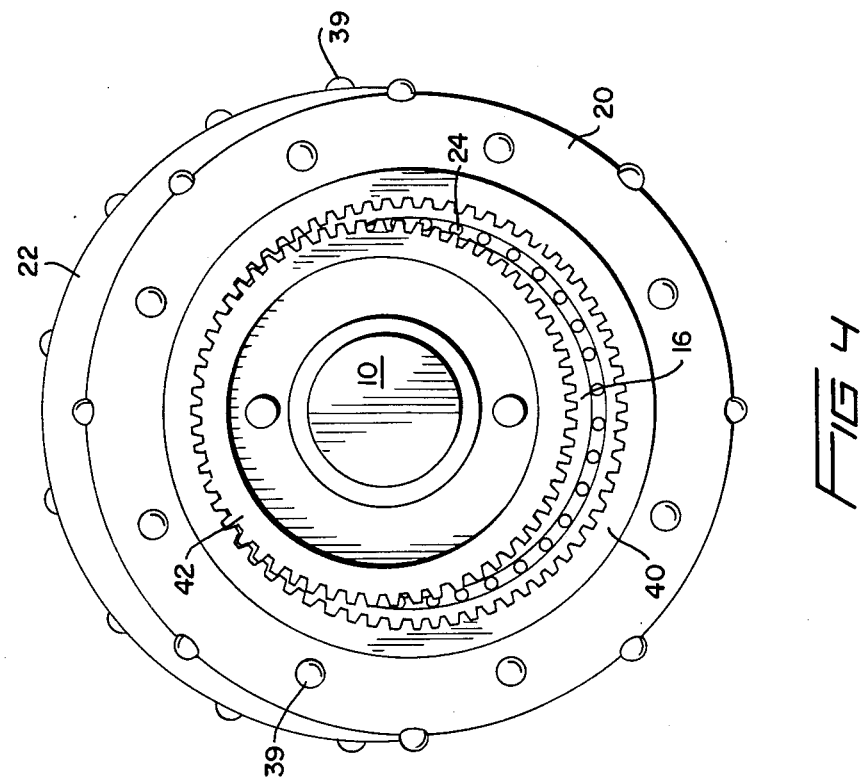
FIGS. 3 and 4 are respectively a fragmentally sectioned end elevation and a side elevation of a second embodiment of the assembly.

The FIG. 1 assembly is shown in the drawing to include a drive shaft 10 and two rollers 12 and 14 the axes of which are displaced by equal distances from and on opposite sides of the axis of the shaft 10.

The rollers consist of hub portions 16 and 18 which are integral with the shaft 10 and each other and peripheral annular cutting elements 20 and 22 which are rotatably mounted on the hubs 16 and 18 on suitable bearings 24.

In this embodiment of the assembly the roller cutting elements are each shown to consist of a ring 26 which carries three saw blades 28 which have hard metal tipped teeth 29, two spacer rings and a lock ring 30 which is fastened in any suitable manner to the ring 26. The blades 28 and the spacer rings which separate them are keyed in any suitable manner against relative rotation of the ring 26.

In use the shaft 10 is mounted on and driven in any suitable manner by a suitable machine. The shaft bearings are preferably resiliently mounted in the machine. When the assembly is driven with the blades against rock the cutting elements will tend to rotate, due to the reaction forces imposed on them, in a direction opposite to the direction of rotation of the roller hubs. This counter rotation of the cutting elements 20 and 22 is desirable as in addition to the high frequency impact cutting or chipping action of the teeth 29 on the rock, the teeth will further comminute the rock by a milling action as they are rotated. Naturally the cutting edges of the teeth 29 will face oppositely to the intended direction of rotation of the roller hubs. In order to ensure counter-rotation of the cutting elements the inner surface of each annulus could include a ring 32 of ratchet teeth (shown only on the right hand roller in the drawing) and a pawl, which may be in the form of a resilient blade 34 which is fixed to the roller hub, which is suitably engaged with the ring teeth to ensure rotation of the cutting element relatively to its hub in only the required reverse direction.

In a more positive system of controlled cutting element rotation (shown on the left roller in the drawing) a first ring gear 36 is fixed to each cutting element concentric with the roller axis and a second larger diameter ring gear 38, which is concentric with the shaft axis, is meshed with it at a point on its circumference. The gear 38 is rotatably mounted on the shaft 10 but is held against rotation by fixed structure on the machine which drives the assembly. As the hubs 16 and 18 are now rotated the reaction forces on the cutting elements cause the gears 36 and so the cutting elements to be rotated by the eccentrically moving fixed gear 38 in the opposite direction to the direction of rotation of their hubs.

The speed of rotation of the cutting elements relatively to the rotational speed of the hubs will be dependent on the ratio of the two gears. A suitable ratio of hub to annulus speed or rotation for most rock cutting applications has been shown from experiments to be about 4 or 5000 rpm to 1 or 200 rpm with an activation amplitude of about 5 mm. The optimum speed of shaft rotation activation amplitude, and hub to annulus gear ratio for cutting a specific type of rock will, however, need to be empirically determined.

In the FIG. 3 and 4 embodiment of the assembly like reference numbers denote like components to those described with reference to FIG. 1. The difference between the two assemblies lies only in the cutting elements 20 and 22 and in the cutting element drive arrangements.

The roller cutting elements are shaped as shown in the drawings and carry hard metal rock cutting studs 39 (shown only in FIG. 4) which are suitable for cutting the type of rock on which the cutter is to be used. The buttons could, however, by replaced by any suitable rock cutting formations such as rock picks, cutting bits, roller discs, abrasive inserts and the like.

The cutting elements are each driven by a ring gear 40 which is fixed to and concentric with the cutting element and a pinion gear 42 which is rotatably mounted on the shaft 10 but as with the FIG. 1 embodiment, is held against rotation by pins 44 which are engaged in fixed structure 46 on the machine which holds and drives the assembly. The operation of this planetary gear system is the reverse to that of the FIG. 1 system in that in this embodiment the held gear 42 is eccentrically driven in the annulus gear 40 as opposed to on the outside of the annulus gear 36 in FIG. 1. the principle of operation of the two systems is, however, the same with the cutting elements being driven in the opposite direction to the direction of rotation of the shaft 10.

Figure 3:
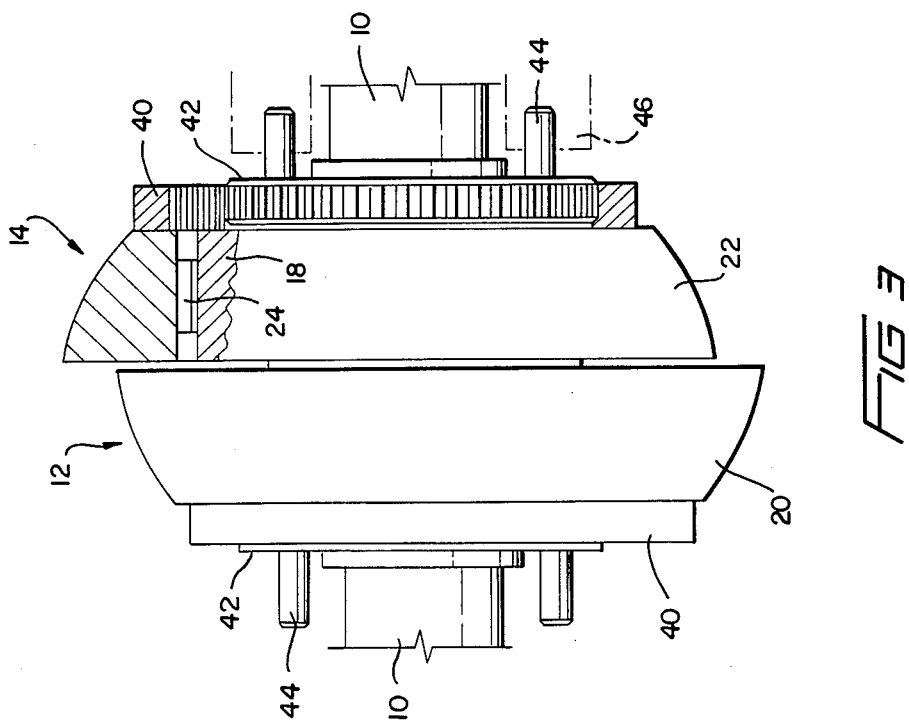

The FIG. 2 embodiment of the cutting assembly, as could be the case with the assembly of FIGS. 3 and 4, consists of only one roller which, in this case, is identical with the right hand roller of FIG. 1, with like reference numbers denoting the same components. This assembly will, however, be highly unbalanced during rotation of the shaft 10 without some means of balancing the eccentricity of the roller. The balancing arrangement could take any suitable form and in this embodiment balance is assomplished by a counterweight 48 which is located in the hub 18.

Although no means is shown in the drawings for limiting movement of the cutting elements in an axial direction such means must obviously be provided and this could be of any suitable form.

The invention is not limited to the precise constructional details as herein described. For example, the rollers 12 and 14 could be separate from and rotatably mounted on the shaft 10 which would then pass through them with any sutiable means being employed to drive the roller hubs on the shaft. Additionally the assembly could include three or even more offset rollers to increase the impact frequency of the assembly rock cutting formations on the rock being cut. It is essential, however, that in the multiple roller embodiments the axes of the eccentric rollers are so arranged around the shaft axis that the rollers counter-balance each other in the assembly and in the case of the single FIG. 2 roller that some suitable means be provided for balancing the roller during rotation.

We claim:

1. A rock cutting assembly including a rock cutting roller with the roller being composed of a central hub portion and an annular cutting element which is rotatably mounted on the hub and carries rock cutting formations, means for driving the hub portion of the roller about an axis which is eccentrically displaced from the hub axis, means engaged with the annular cutting element to limit its direction of rotation relatively to that of its hub to one direction only and means for balancing the roller against its eccentricity as the hub is rotated about its drive axis.

2. A rock cutting assembly as claimed in claim 1 in which the cutting element rotation limiting means on each cutting element is a ratchet arrangement.

3. A rock cutting assembly as claimed in claim 2 in which the ratchet arrangement consists of a toothed ring on each cutting element and a movable pawl on its hub which is engaged with the teeth on the ring.

4. A rock cutting assembly as claimed in claim 1 in which the cutting element rotation limiting means on each roller includes a first ring gear which is attached to the roller cutting element and a second gear which is meshed with the first and is non-rotatably attached to fixed structure adjacent the roller.

5. A rock cutting assembly including a plurality of rock cutting rollers with each roller comprising a central hub portion having a hub axis and an annular cutting element which is rotatably mounted on the hub and which carries rock cutting formations; means for driving the hub portion of each roller about a drive axis which is eccentrically displaced from the hub axis, said rollers being rotatable about a common drive axis with the axis of each roller hub being eccentrically displaced by a common distance and in such a direction from the drive axis that the rollers balance each other as the rollers are rotated about the common drive axis; and means of each roller engaged with the annular cutting element to limit its direction of rotation relative to that of its hub to one direction only.

6. A rock cutting assembly as claimed in claim 5 in which the hub portion of each roller is integral with that of an adjacent roller.

7. A rock cutting assembly as claimed in claim 6 in which the hub portions of the outer rollers of the assembly each carry a support shaft which lies on the drive axis of the rollers.

8. A rock cutting assembly as claimed in claim 5, in which the cutting element rotation limiting means on each cutting element is a ratchet arrangement.

9. A rock cutting assembly as claimed in claim 5, in which the ratchet arrangement consists of a toothed ring on each cutting element and a movable pawl on its hub, the ratchet arrangement engaging the teeth on the ring.

10. A rock cutting assembly as claimed in claim 5, in which cutting element rotation limiting means on each roller includes a first ring gear which is attached to the roller cutting element and a second gear which is meshed with the first and is non-rotatably attached to fixed structure adjacent the roller.

* * * * *